United States Patent [19]

Dubuit

[11] Patent Number: 4,574,939
[45] Date of Patent: Mar. 11, 1986

[54] AUTOMATIC BOTTLE HANDLING APPARATUS

[76] Inventor: Jean-Louis Dubuit, 63 Rue du Chemin-Vert, 75011 Paris, France

[21] Appl. No.: 689,282

[22] Filed: Jan. 7, 1985

Related U.S. Application Data

[63] Continuation of Ser. No. 377,071, May 11, 1982, abandoned.

[30] Foreign Application Priority Data

May 13, 1981 [FR] France ................ 81 09493

[51] Int. Cl.$^4$ ..................... B65G 47/14; B65G 47/24
[52] U.S. Cl. ................................ 198/396; 198/398
[58] Field of Search ............... 198/395, 396, 398, 400, 198/502

[56] References Cited

U.S. PATENT DOCUMENTS

| | | | |
|---|---|---|---|
| 3,260,363 | 7/1966 | Vukosic | 198/398 |
| 3,341,837 | 9/1967 | Washington | 198/502 |
| 3,392,815 | 7/1968 | Skeels, Sr. et al. | 198/400 |
| 3,433,966 | 3/1969 | Letch et al. | 198/502 |
| 3,446,335 | 5/1969 | Dubuit | 198/400 |
| 3,465,869 | 9/1969 | Benatar | 198/502 |
| 3,690,437 | 9/1972 | Kammann | 198/393 |
| 3,776,346 | 12/1973 | Dubuit | 198/396 |
| 4,148,390 | 4/1979 | Ionescu | 198/400 |
| 4,213,526 | 7/1980 | Graham et al. | 198/400 |
| 4,328,887 | 5/1982 | Beard et al. | 198/396 |
| 4,366,897 | 1/1983 | Azuma et al. | 198/502 |

FOREIGN PATENT DOCUMENTS

| | | |
|---|---|---|
| 1756942 | 3/1971 | Fed. Rep. of Germany . |
| 2207850 | 6/1974 | France . |
| 2275387 | 1/1976 | France ................ 198/400 |
| 1347495 | 2/1974 | Japan ................ 198/400 |
| 479472 | 11/1969 | Switzerland . |

Primary Examiner—Joseph E. Valenza
Assistant Examiner—Daniel R. Alexander
Attorney, Agent, or Firm—Charles E. Brown; Charles A. Brown

[57] ABSTRACT

An automatic bottle handling machine comprises a storage hopper for bottles in random orientation, a plurality of conveyor channels having conveyors extending between the hopper and a corresponding plurality of drop chutes and selective reversing devices for turning around neck first bottles before reaching the drop chutes. A sensor in each drop chute detects the prolonged presence of a bottle therein to stop the corresponding conveyor. A yoke member below each sensor indefinitely arrests the downward movement of an incorrectly oriented bottle or a defective bottle having a spur or flash on the bottom thereof to stop traffic in the corresponding drop chute and thereby stop the supply of bottles by the corresponding conveyor until the offending bottle has been removed by the operator. Another sensor for detecting a crushed bottle may be provided at the upper end of each drop chute for similarly stopping the corresponding conveyor.

16 Claims, 12 Drawing Figures

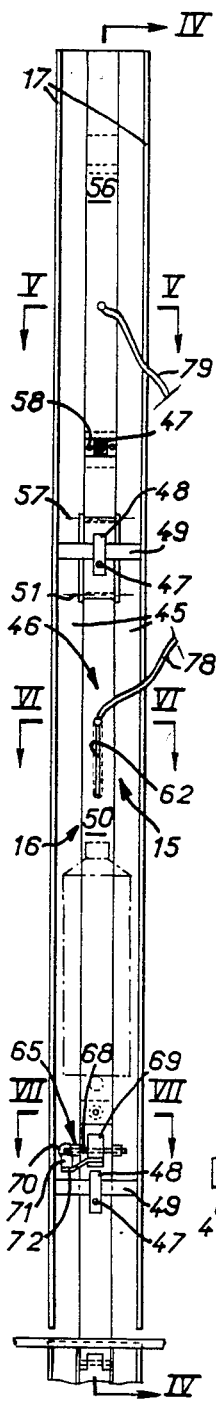
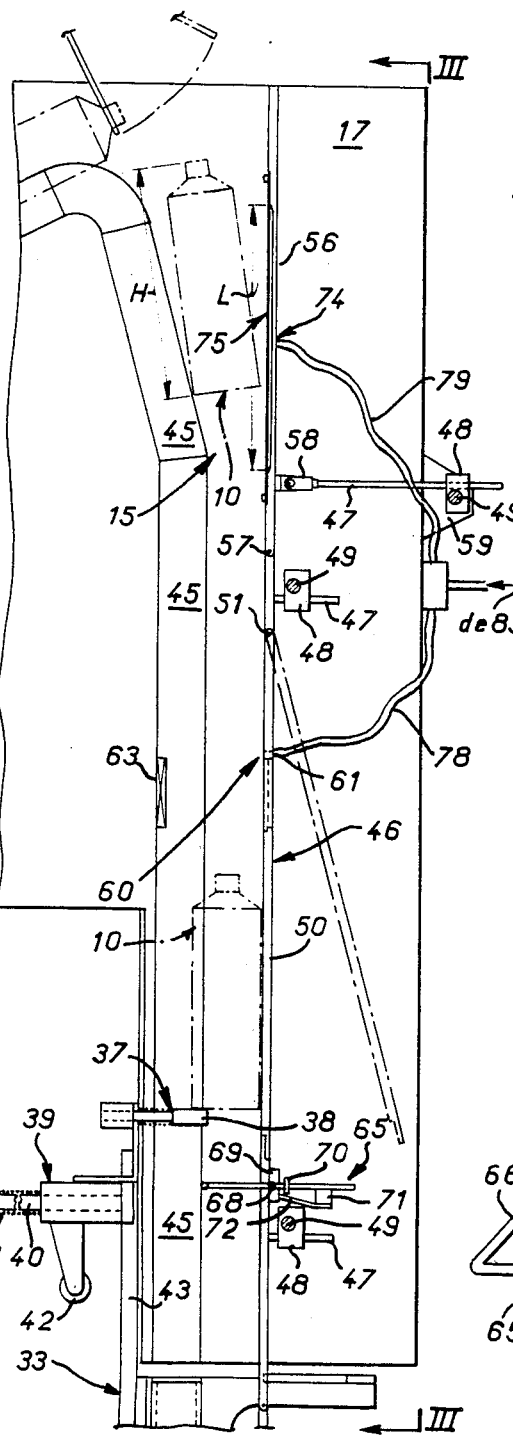
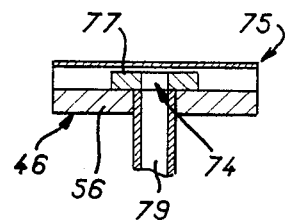
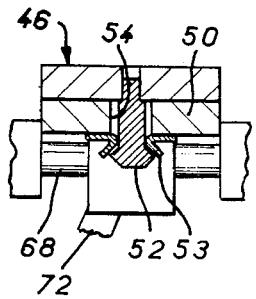
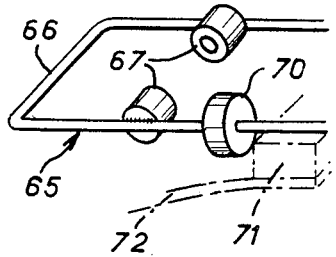

AUTOMATIC BOTTLE HANDLING APPARATUS

This is a continuation of application Ser. No. 377,071, filed May 11, 1982, now abandoned.

BACKGROUND OF THE INVENTION

The present invention relates generally to apparatus for automatic handling and orientation of hollow bodies from a storage hopper to a work station for filling, labeling or some other operation on the hollow bodies, and more particularly though not exclusively to the case where the hollow bodies are containers such as bottles having necks.

For example, when such bottles are to be filled at a filling station their necks must be directed upwards.

Generally speaking, the automatic handling and orientation apparatus for such bottles or other hollow bodies so oriented comprise a storage hopper in which the bottles or other hollow bodies are in random orientation, a plurality of conveyor channels each having a conveyor extending into the storage hopper, a plurality of drop chutes disposed in vertical alignment with the respective remote ends of the conveyor channels and a delivery conveyor disposed in vertical alignment with the drop chutes.

At the upper ends of each drop chute is provided in practice a selective bottle reversing device which turns around a bottle which has an incorrect orientation for dropping it in the correct orientation into the corresponding drop chute. On the contrary when such a bottle is in the desired orientation the selective bottle reversing device retracts and allows the bottle to fall down the drop chute without taking any further action.

When the hollow bodies being handled are bottles with necks the selective reversing device may comprise a pivoted swing member the opening defined by the swing member is adapted to receive the neck of a bottle when the bottle is advancing neck first into the drop chute, to turn the bottle around so that it falls bottom first into the corresponding drop chute. Accordingly all the hollow bodies received by the delivery conveyor are therefore all normally received on their bottoms before being transported to the filling or other work station.

Such an apparatus for automatic handling and orientation of bottles is disclosed in U.S. Pat. No. 3,776,346.

In the above-mentioned U.S. patent each of the drop chutes is provided with sensing means for detecting the prolonged presence of a bottle and is adapted to stop the conveyor of the corresponding conveyor channel. Thus when for any reason the drop chute is jammed the conveyor of the corresponding conveyor channel is automatically stopped thereby avoiding disrupting the operation of the entire apparatus.

Such an automatic handling and orientation apparatus has given and continues to give satisfaction; it does have the drawback of requiring the presence of person at all times to monitor operation. Indeed, various incidents may occur which can disrupt operation.

First, the selective reversing device may not operate properly and if the hollow bodies are bottles with necks, for example, the bottle will drop neck first onto the discharge conveyor. Since the neck first bottle on the discharge conveyor is inherently unstable it will fall over causing the entire apparatus to be shut down. Thus, such a minor operating incident in one of the drop chutes may have repercussions on the entire apparatus.

This also applies to handling plastic bottles which owing to a manufacturing defect may having a projecting spur or flash produced in the course of molding which may cause the defective bottle to topple thereby resulting in the stoppage of the entire apparatus.

It is also possible with such plastic bottles for a partially crushed bottle to have a transverse dimension sufficient to accidentally block the inlet or upper end of a drop chute thereby producing the jamming of the drop chute above the sensing means detecting the prolonged presence of bottles, which sensing means is usually provided at the bottom of the corresponding drop chute. In this case the conveyor in the conveyor channel continues to operate, despite the jamming of the corresponding drop chute, which may in turn cause total disruption of the apparatus.

Although such incidents are in practice relatively infrequent they do require the presence of a person to eliminate the defective bottle and start the apparatus up again, and this person must remain at the apparatus at all times even though he has to intervene rather infrequently.

OBJECT AND SUMMARY OF THE INVENTION

An object of the invention is the provision of arrangements for minimizing the consequences of these operating incidents and therefore to permit the reduction of supervision time and make it possible to monitor the machine intermittently.

In accordance with the invention there is provided an apparatus for automatic handling of hollow bodies, said apparatus comprising a plurality of conveyor channels having conveyors extending to the respective upper ends of a corresponding plurality of drop chutes, a delivery conveyor disposed below and in vertical alignment with said plurality of drop chutes, and selective arresting means at the lower ends of said drop chutes, said selective arresting means permitting correctly oriented hollow bodies to pass and indefinitely holding back an incorrectly oriented hollow body.

When the hollow bodies are bottles with necks the arresting means may be very simply constructed as the selective reversing device described above, that is a swing or yoke member with an opening for receiving the neck or some other projecting portion on the bottle and freely pivotally mounted between a normal standby position in which the opening is disposed substantially transversely to the corresponding drop chute along the path of travel of the bottles and an operative position in which it is pushed back by a bottle allowing the bottle to clear the arresting means or it yokes the bottle to hold it back. The arresting means is provided with biasing means e.g. a counterweight, for biasing the yoke member to its standby position.

Thus, such an arresting means mechanically holds back a bottle in its neck first orientation until such time as the operator takes the action necessary. First of all, the incorrectly oriented or defective bottle does not reach the delivery conveyor on which the bottles from all the drop chutes are received and therefore this incorrectly oriented or defective bottle cannot create general disruption of the apparatus requiring the entire apparatus to be shut down. The consequences of such a defective or incorrectly oriented bottle are thus advantageously limited to the immobilization of the corresponding drop chute and conveyor channel without affecting the operation of the rest of the apparatus.

According to a second aspect of the invention there is provided an apparatus for automatic handling and orientation of hollow bodies, said apparatus comprising a hopper for storing hollow bodies in random orientation, a plurality of conveyor channels having conveyors extending into said hopper, selective reversing means adapted to turn around incorrectly oriented hollow bodies in said conveyor channels, a plurality of drop chutes disposed in vertical alignment at the ends of said conveyor channel remote from said hopper, a delivery conveyor disposed in vertical alignment with and below said plurality of drop chutes, each of said drop chutes having sensing means for detecting the prolonged presence of a hollow body in its drop chute and is response thereto providing a control signal for stopping the conveyor of the associated conveyor channel. The improvement comprises arresting means in each of said drop chutes disposed below the associated sensing means for indefinitely holding back an incorrectly oriented hollow body, whereby the holding back of an incorrectly oriented hollow body by one of said arresting means eventually causes the prolonged presence of a hollow body in the associated drop chute to be detected by the associated sensing means and thereby stopping the conveyor of its associated conveyor channel.

Owing to the immobilization of an incorrectly oriented or defective bottle the corresponding drop chute is progressively jammed up, which is detected by the sensing means upstream of the arresting means in the same drop chute thereby stopping the corresponding conveyor in the conveyor channel without having any effect on the rest of the apparatus.

Thus until action is taken by the operator the arresting means jam up traffic in its drop chute and thereby triggers the sensing means to take the drop chute and the corresponding conveyor out of operation.

It is to be noted that especially in the above aspect of the invention, the arresting means preferably has a structure similar to that of a conventional selective reversing device, but it has a function different from that of a selective reversing device since it yokes and holds back the incorrectly oriented or defective bottle and does not change the orientation of the bottle, and on the other hand, it cooperates with the sensing means for the same drop chute to jam the drop chute and stop the conveyor of the corresponding conveyor channel upstream thereof. Thus, according to this aspect of the invention, the arresting means cooperates with the sensing means of the same drop chute.

According to an embodiment of the invention a second sensing means is provided connected in parallel with the first mentioned sensing means in the upper part of each drop chute for controlling the stopping of the conveyor of the corresponding conveyor channel and preferably the second sensing means is actuated by a flap which is longer than the height of the hollow bodies being handled and extends longitudinally to both sides of the second sensing means in the drop chute, overlying a wall of the drop chute and spaced therefrom.

The second sensing means is triggered by the jamming of the drop chute by a crushed or other defective bottle, such a bottle coming to bear sufficiently at a point on the flap.

The jamming up of the drop chute due to the crushed bottle thus cuts off the supply of bottles thereto without affecting the rest of the apparatus.

Hence the apparatus according to the invention is advantageously of high regular operation since the drop chute affected by a defective or incorrectly oriented is stopped and the incident is localized.

To be sure, in British Pat. No. 1,042,749 there are provided in succession in the drop chutes of a handling apparatus three stop members which for various reasons are adapted to stop the articles being handled. But the operation of these stop members is apparently for a definite period; these stop members may not be considered to arrest the incorrectly oriented bottle indefinitely, preventing it from continuing its further downward movement it its drop chute. On the contrary, the stop members in the British patent stop each of the articles reaching the same only momentarily.

Further, even though one of the stop members is associated with a sensing means for counting the articles it does not effect in cooperation with the sensing means a stopping of the feeding of articles to the drop chute concerned unlike the sensing means of the present invention.

According to a preferred embodiment each of the drop chutes is associated with a signaling means such as a signal lamp which may be at a remote location, and preferably with a time delay, controlled by one or both of the sensing means of a particular drop chute. The signaling means is therefore responsive to the operation or nonoperation of the conveyor of each conveyor channel.

Thus the person monitoring the apparatus may have other functions at the same time. At each instant the person is informed by a control panel of the number of drop chutes in operation and therefore without permanent presence at the apparatus may decide the best moment to take action as a function of his other functions and the relative urgency of the situation to be dealt with.

It is even possible, according to a further feature of the invention, to monitor the operation of the apparatus of a plurality of such apparatus with a microprocessor, for example, as a function of the number of bottles to be handled at a particular work station and the number of bottles at the outlet of the corresponding dispensing device or devices, in view of the number of drop chutes actually in operation, with automatic monitoring to inform the operator whenever immediate intervention is required.

These and other features and advantages of the invention will be brought out in the description which follows given by way of example, with reference to the accompanying drawings.

BRIEF DESCRIPTION OF THE DRAWINGS

FIG. 3 is a fragmentary front elevational view, on a different scale, of one of the drop chutes, take on its own, of the bottle handling apparatus;

FIG. 4 is a longitudinal sectional view taken on line IV—IV in FIG. 3 of the drop chute in that figure;

FIG. 8 is an enlarged detail of the area included within phantom line box VIII in FIG. 5;

FIG. 9 is also on enlarged detail view of the area included within phantom line box IX in FIG. 7;

FIG. 10 is a perspective view of the arresting means employing in a drop chute;

DESCRIPTION OF THE PREFERRED EMBODIMENT

Figure 1:
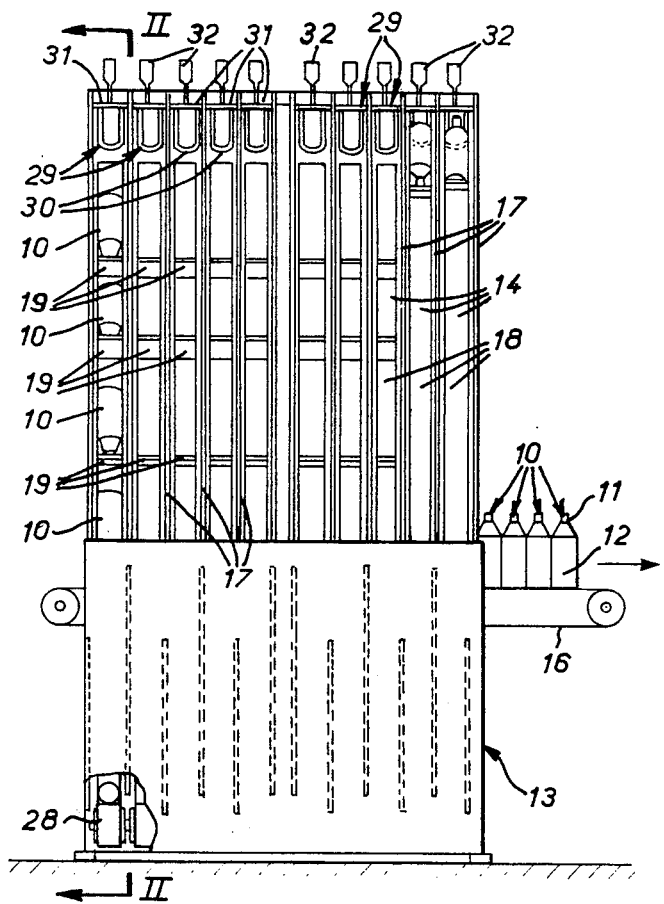
FIG. 1 is a rear elevational view, partly cutaway, of an automatic bottle handling apparatus embodying the invention.
Figure 5:
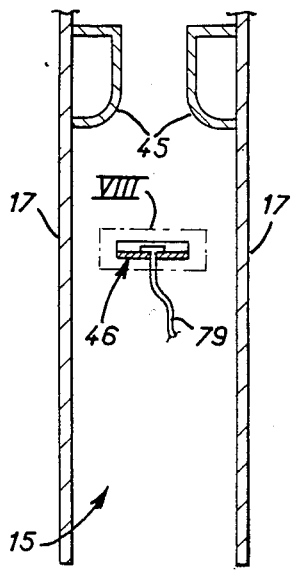
FIGS. 5, 6 and 7 are respectively cross-sectional views taken on lines V—V, VI—VI and VII—VII in FIG. 3.

The drawings show, by way of example, automatic machine for handling bottles 10 with necks 11 and bottoms 12, of the type disclosed in the above-mentioned U.S. Pat. No. 3,776,346.

The automatic bottle handling machine generally comprises a storage hopper 13 storing bottles 10 in random orientation, a plurality of conveyor channels 14, ten in the illustrated embodiment, extending at an angle into the storage hopper 13, a plurality of drop chutes 15, also ten in the illustrated embodiment. The drop chutes 15 are arranged at the ends of the channels 14 remote from the hopper 13 in vertical alignment with respective conveyor channels 14, and a delivery conveyor 16 is disposed in vertical alignment with and below the drop chutes 15.

Such an automatic bottle handling machine is well known per se and therefore it will not be described comprehensively. Only those features necessary to understand and carry out the invention will be described in detail.

The conveyor channels 14 and the drop chutes 15 are defined between pairs of parallel partitions 17. Each conveyor channel 14 comprises between a pair of partitions 17, a single endless belt conveyor 18 which also extends generally at a angle from its lower end at the hopper 13 to its upper end at the corresponding drop chute 15. At longitudinally spaced locations the belt conveyor 18 comprises transverse dogs 19 for driving bottles 10.

Figure 2:
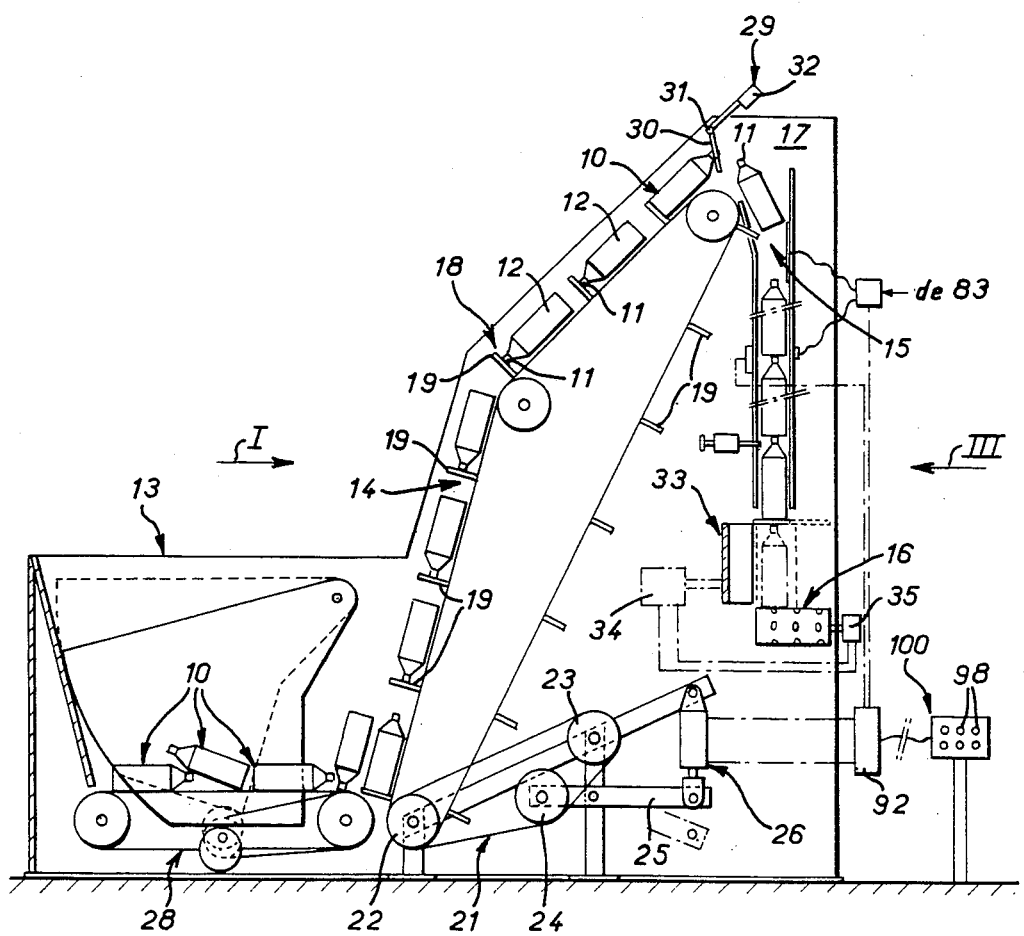
FIG. 2 is a sectional view of the bottle handling machine taken along line II—II in FIG. 1.

Each belt conveyor 18 is controlled by an endless drive belt 21 which is run over an idler pulley 22, a drive pulley 23 and a take-up pulley 24, see FIG. 2. The take-up pulley 24 is carried by a lever 25 pivotally mounted under the control of a cylinder-and-piston unit 26. As will be readily understood, when the lever 25 is in its solid line position in FIG. 2 the drive belt 21 is taut and the conveyor belt 18 is driven thereby, in other words it is operative. When, on the contrary, the lever 25 is moved by the cylinder-and-piston unit 26 to the broken line position in FIG. 2, the drive belt is slack and it is no longer capable of driving the conveyor belt 18 which is then stopped.

At the lower end of belt conveyor 18 of each conveyor channel 14 there is provided an intermediate belt conveyor 28 for carrying bottles from the hopper 13 to the belt conveyor 18. A selective reversing device 29 is provided at the upper ends of the conveyors 18 of each conveyor channel 14 at the top or inlet end of the corresponding drop chute 15. Since the hollow bodies handled by the illustrated machine are bottles 10 with neckes 11 the selective reversing device 29 comprises, as shown, swing member 30 pivoted at 31 against the action of suitable biasing means, a mere counterweight as illustrated in FIGS. 1 and 2.

When a bottle 10 driven by the conveyor 18 arrives bottom first at the selective reversing device 29, the swing member 30 is simply pushed out of the way and the bottle falls bottom first into the corresponding drop chute 15. On the other hand, when the bottle 10 reaches the swing member 30 neck first, as shown in FIG. 2, the bottle is momentarily held back at its neck 11 while it continues to be pushed at its bottom 12 by the conveyor 18 and it is normally turned over before falling into the drop chute 15. As in the preceding case the bottle 10 falls bottom first into the drop chute 15.

But in practice such a reversing device is not 100 percent effective and from time to time a bottle 10 falls neck first into its drop chute 15. Further, defective bottles sometimes are not eliminated before they reach the automatic bottle handling machine, for example a spur or flash may be formed on the bottom of a plastic bottle in the course of molding. Whether the bottle is defective or the orientation is incorrect the chances of its landing in a stable position on the delivery conveyor 16 are jeopardized.

Now, between the bottoms of the drop chutes 15 and the delivery conveyor 16 is a compartmented sliding transfer member 33 which has control means 34 controlled synchronously with the control means 35 for the delivery conveyor 16, as shown in chain-dotted lines in FIG. 2. The sliding transfer member 33 is movably mounted for transverse reciprocation between a retracted standby position, shown in solid lines in FIGS. 2 and 12, in which the bottles 10 reaching the bottom of the drop chutes are momentarily retained and a forward release position, shown in solid lines in FIG. 4, in which the bottles 10 are freed and allowed to reach the delivery conveyor 16.

If one of the bottles 10 does not stand properly on the delivery conveyor 16 the bottle 10 may topple and when the sliding transfer member 33 is returned to its forward position it may cause the blocking of the transfert member which by virtue of the usual safety equipment associated with the machine automatically stops the entire machine.

At the bottom of each drop chute 15 is provided in association with the sliding transfer member 33 a stop member 37. The head 38 of the stop member 37 is resiliently retractable and carried by a carriage 39 common to all the drop chutes 15 parallel to the sliding transfer member 33 mounted for transverse reciprocation on guides 40 against the action of return springs 41. A roller 42 is provided at each end of the carriage 39 in driving cooperation with a drive bar 43 fixed for movement with the sliding transfer member 33.

In the forward position of the transfer member 33 the carriage 39 is in a forward position in which the stop members 37 protrude into the drop chutes 15 and retain the bottles. When the transfer member 33 moves to its retracted standby position the drive bars 43, after some lost motion, drive the carriage 39 and the stop members 37 to the retracted position, as shown in FIG. 12, releasing in the drop chutes 15 the previously retained bottles 10.

Figure 12:
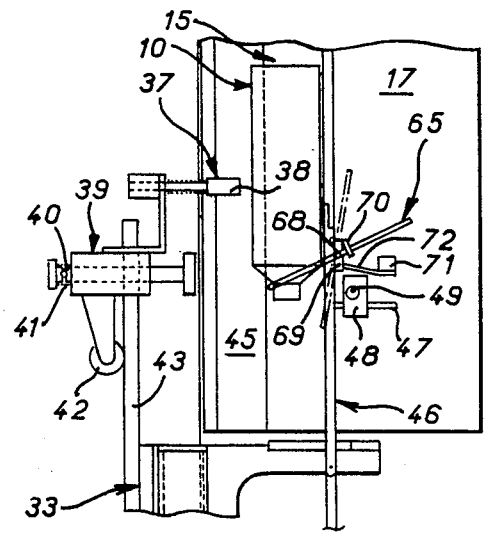
FIG. 12 is a fragmentary view of FIG. 4 showing the operation of the arresting means in one of the drop chutes of the bottle handling machine.

The bottles 10 in the drop chute 15 move one step down and another series of bottles reach the sliding transfer member 33 which retains them momentarily, as shown in FIGS. 2 and 12. When the sliding transfer member 33 moves to its forward release position, it releases the series of bottles momentarily retained and then they drop to the delivery conveyor 16.

At the beginning of its return movement the sliding transfer member 33 is accompanied by the carriage 39. The carriage 39 reaches its forward position before the sliding transfer member 33 so that before the series of bottles are released the stop members 38 protrude below the new row of bottles 10 and prevent them falling.

Figure 6:
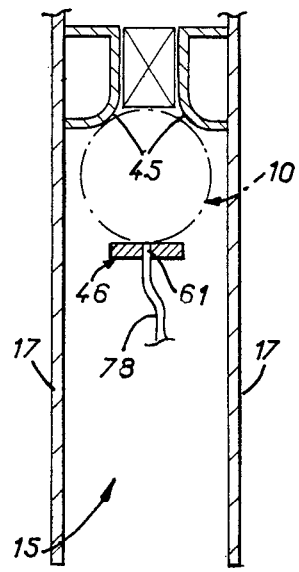
Figure 7:
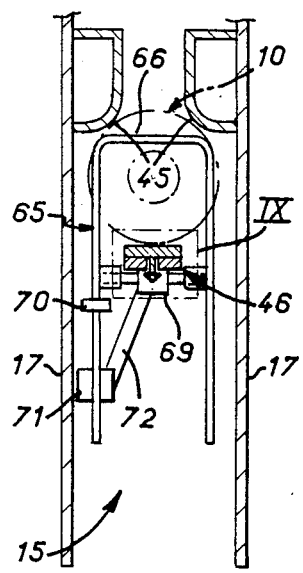

Besides the partitions 17 each drop chute 15 comprises rear guide members 45 each of which is mounted on one of the partitions 17, and a front plate 46 between the partitions 17. The rear guide members 45 and the front plate 46 are arranged so as to circumscribe the cross section of a bottle 10 being handled, schematically represented a phantom line in FIG. 6.

For example, the rear guide members 45 are stationary and the front plate 46 is adjustable in position. As illustrated the rear guide members 45 are generally rectangular in cross section with a quarter-round corner such as disclosed in my above-mentioned U.S. patent. Alternatively, the rear guide members may be of semicircular cross section also disclosed in my U.S. patent.

The front plate 46 is adjustable in position by means of rods 47 at spaced locations adjustably mounted in position in guide members 48 carried by cross members 49 extending between a pair of partitions 17.

According to a feature of the invention at least part of the front plate 46 is movable to provide access to corresponding part of the associated drop chute 15. In practice, as shown, the lower part 50 of the front plate 46 is pivotably mounted by a hinge 51 disposed at its upper end between a closed position, in solid lines in FIG. 4, in which the front plate 46 is in continuity and an open position, in phantom lines in FIG. 4, for access to the part of the corresponding drop chute in line with the stop member 37 thereof.

For latching the lower part 50 of the front plate 46 detent means are provided as illustrated in FIG. 9. The detent means, as shown, comprise a male detent member 52 projecting relative to the front plate 46 and springs 53 which are carried on the pivoting lower part 50 of the front plate 46 to either side of an opening 54 adapted to receive the male detent member 52.

The upper part 56 of the front plate 46 may also be pivotally mounted to adjust its position as shown in the illustrated embodiment. To this end the upper part 56 of the front plate 46 is pivoted at its lower end about a hinge 57 on the stationary part of the front plate and the rod 47 carrying the upper part 56 is pivoted in a yoke 58. The pin 49 carrying the guide member 48 on the rod 47 is in turn adjustable in position, but not by the corresponding partitions 17 as above, but by angle members 59 secured to and in front of the partitions 17 (not shown in FIG. 3).

As disclosed in my above-mentioned U.S. patent each of the drop chutes 15 is equipped with first sensing means 60 for detecting the prolonged presence of a bottle in line therewith and adapted to control the stopping of the conveyor 18 of the conveyor channel therefor in response to the prolonged presence of such a bottle.

Preferably, each first sensing means 60 comprises a blower nozzle 61 received in a longitudinal slot 62 in the pivotable lower part 50 of the front plate 46 of the related drop chute 15. The blower nozzle 61 is adjustable in height in the slot 62. Facing the blower nozzle 61 between the rear guide members 45 of the drop chute 15 is a fluidic cell 63.

According to the invention, at the lower end of each drop chute 15, below the sensing means 60 associated therewith, is arresting means 65 for holding back a bottle 10 which indefinitely stops the downward movement of an incorrectly oriented bottle, e.g., in neck first position, and also a correctly oriented bottle, e.g., in bottom first position, having a sufficiently long projection on the bottom 12, such as a spur or flash produced during molding the bottle.

In the illustrated embodiment the bottles 10 have necks 11 and the arresting means 65 comprises a yoke member or loop 66 adapted to yoke or hook the neck 11 of the bottle 10 or some other protrusion on the bottle. The yoke member 66 has a normal standby position in which it is disposed transversely to its drop chute 15 and is thereby interposed along the pathway of bottles 10 as shown in FIG. 4. The yoke member 66 has an operative position to which it is driven by a correctly oriented and nondefective bottle to permit the bottle 10 to clear the yoke member 66, as shown in phantom lines FIG. 12, or to which it is driven by an incorrectly oriented or defective bottle which it arrests and holds back as schematically shown in solid lines in FIG. 12. Means are associated with the yoke member 66 for biasing the latter to its standby position.

As illustrated the yoke member 66 comprises an intermediate U-shaped swing member and two spaced apart legs. Bushings 67 provided on the respective legs are journaled on the ends of a shaft 68 secured by a support 69 to the front plate 46 of the corresponding drop chute 15.

In the illustrated embodiment the biasing of the arresting means is effected simply by gravity. The legs of the U-shaped yoke member 66 extending beyond the bushings 67 and one of the legs carries a counterweight 70 adjustable in position. Preferably, the adjustment of the counterweight 70 is such that in the standby position the arresting means 65 is in some equilibrium position so that it may be readily pushed by a bottle 10 in the course of its fall in the drop chute 15.

Preferably, the arresting means 65 may comprise a damper member for the standby position. In actual practice the damper member comprises an elastic pad 71 which is carried by a bracket 72 fixed to the support 69. The free end of one of the legs of the U-shaped yoke member 66 bears against the elastic pad 71 on bracket 72 in the standby position.

A second sensing means 74 is provided at the upper end of each drop chute 15 for detecting the presence of bottles. The second sensing means 74 is connected in parallel to the first sensing means 60 and like the first sensing means, is adapted to stop the conveor 18 in the corresponding conveyor channel 14. Preferably, as shown, the second sensing means 74 is actuated by a flap 75 having a length L longer than the height H of the bottles 10 and extending to both sides of the second sensing means 74 in the corresponding drop chute 15 overlying and spaced from one of the walls thereof. As illustrated the flap 75 overlies the upper part 56 of the front plate 46 forming one of the walls of the drop chute 15 and to this end the corresponding upper wall part 56 is locally of reduced thickness.

As illustrated the flap 75 comprises a metal foil sufficiently thin to be easily deformed and fixed at each end to the upper part 56 of the front plate 46. The second sensing means 74 comprises a blower nozzle for directing a jet of air toward middle of the flap 75 in the opening of a gasket 77 from which the flap 75 is normally slightly spaced as shown in FIG. 8. In this embodiment the second sensing means 76 comprises a controlled bleed fluidic detector. The blower nozzles 61 and 74 are respectively connected to a compressed air source by hoses 78 and 79 as will be described below.

Figure 11:
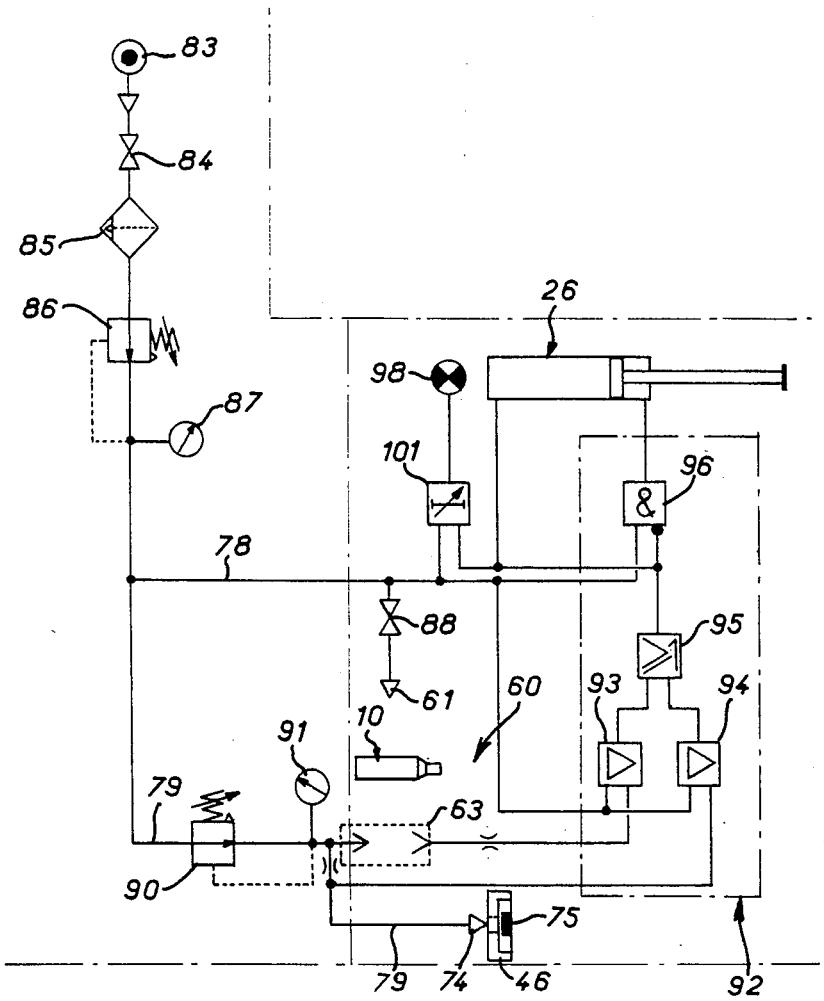
FIG. 11 is a block diagram of the various sensing means monitoring the operation of a drop chute.

As illustrated in the block diagram in FIG. 11, the compressed air source which is designated by reference 83 is controlled by a valve 84, an air filter 85, a pressure reducer 86, and a manometer 87. The compressed air source 83 supplies through hose 78, under the control of stop valve 88, the blower nozzle 61 and through hose 79, under the control of a pressure reducer 90 and a manometer 91, the fluidic cell 63 and the blower nozzle 74. The fluidic cell 63 and the blower nozzle 74 supply fluidic logic circuit 92 for controlling the cylinder-and-piston unit 26 which in turn controls the operation or stopping of the conveyor 18 in the corresponding conveyor channel 14.

As illustrated the logic circuit 92 comprises two amplifiers 93, 94, one of the inputs of which is connected in parallel to the fluidic cell 63 and blower nozzle 74 and the other inputs are connected directly to the pressure controlled by the manometer 87.

The outputs of the amplifiers 93, 94 are in turn connected in parallel to the inputs of an OR gate 95. The output of OR gate 95 controls one of the ends of the cylinder-and-piston unit 26 and controls the other end of the cylinder-and-piston unit 26 through a NO gate 96 having another input communicating directly with the pressure controlled by the manometer 87.

According to the invention, signaling means 98, e.g. a signal lamp, is associated with each one of the drop chutes 15 and controlled by the logic circuit 92 in parallel with the corresponding cylinder-and-piston unit 26 and thus responsive to the operative condition of the conveyor 18 in the associated conveyor channel 14.

As shown in FIG. 2, the signaling means 98 may be at a remote location 100 from the actual machine permetting monitoring thereat.

In any event the signaling means 98 is preferably time delayed by a time delay 101 interposed between and logic circuit 92 and the signaling means 98.

When the bottles 10 are correctly oriented and free of detectable defects, they drop bottom first in the drop chutes 15 and the operations proceed as described above.

Each time a passing bottle 10 prevents the air jet from the blower nozzle 61 of the first sensing means 60 in each drop chute from reaching the associated fluidic cell 63, but the fluidic cell is time-delayed so that the normal passage of bottles 10 has no effect on the logic circuit 92.

In the course of their fall in the drop chutes 15 the bottles 10 simply push the arresting means 65 out of the way as diagrammatically shown in phantom lines in FIG. 12 and therefore the arresting means 65 does not intervene.

Between consecutive bottles 10 the arresting means 65 returns rapidly to its standby position and owing to the fact that it is in equilibrium in this position and the presence of the damper member 71 there is practically no rebound. It is therefore ready to operate on each passing bottle 10.

If, the bottle 10 arrives at the arresting means 65 neck first the arresting means yokes or hooks the neck and the bottle is thus in effect "trapped" by the arresting means.

This is likewise the case when the bottom of the bottle 10 has a sufficiently large projecting spur or flash. In pushing away the arresting means 65 the bottle is forced to pivot and the arresting means 65 progressively brings it toward the front plate 46 of the particular drop chute 15 until it is wedged against the front plate 46.

When the bottle is incorrectly oriented or it has a spur or flash on the bottom thereof, the bottle is held back in its drop chute 15 indefinitely, that is, until such time the person monitoring the machine takes whatever action necessary. Owing to the stopping of the incorrectly oriented or defective bottle, there results a gradual jamming up of traffic in the drop chute 15 which is detected by the first sensing means 60 and the logic circuit thus changes the position of the cylinder-and-piston unit 26 which in turn stops the conveyor 18 in the associated conveyor channel 14. Thereupon the supply of bottles to the associated drop chute 15 is halted.

The other drop chutes 15 of the machine continue to operate normally and thus the presence of an incorrectly oriented bottle or a bottle having a spur or flash on its bottom has no effect on the operation of the entire machine.

After a predetermined period, determined by time delay 101, the person monitoring the machine is warned by the signal lamp that one of the drop chutes 15 has stopped. When the operator considers it necessary he removes the trapped bottle after opening the lower part 50 of the front plate 46. In practice the time delay is set so that it is greater than the time delay of the sensing means 60 so as not to react to the normal traffic of bottles. In the illustrated embodiment the time delay for the first sensing means 60 is simply effected by the length of the line connecting the fluidic cell 63 with the logic circuit 92.

In addition to the foregoing whenever a crushed bottle reaches the top of a drop chute 15 oriented transversely and its transverse dimension is greater than normal and sufficient to cause the jamming in the drop chute 15, such a defective bottle 10 acts on the flap 75 at some point thereon actuating the second sensing means 74. Consequently, if the thin flap 75 is locally deformed it moves closer to the gasket 77 around the blower nozzles of the second sensing means 74 and the normal bleeding action at the outlet orifice of the blower nozzle between the gasket 77 and the flap 75 is disrupted or stopped entirely. As above, the logic circuit 92 controls the cylinder-and-piston unit 26 thereby stopping the conveyor 18 in the corresponding channel 14. Also as above, the person monitoring the operation of the machine is warned of the stoppage by the signaling means 98 and may intervene by eliminating the defective bottle 10 jammed in its drop chute.

Generally speaking, a drop chute 15 may be stopped at any point in time the closing the stop valve 28 which controls the blower nozzle 61 which permits, for example, to temporarily reduce the number of drop chutes working in the machine.

The invention is of course not limited to the illustrated and described embodiment but encompasses alternatives and variations understood to those skilled in the art without departing from the spirit and scope of the invention.

In this respect the sensing means instead of being fluid operated may be electrically operated.

Further, the field of the invention is not restricted to the handling of bottles with necks but includes, on the contrary, the handling of any hollow bodies. All that is necessary is that the selective reversing device and the arresting means be capable of acting mechanically thereon to carry out their stated functions. For instance, for large mouthed jars or bottles the selective reversing device and the arresting means may comprise a mandrel adapted to be received in the mouth of the bottle or jar.

What is claimed is:

1. An apparatus for automatic handling of hollow bodies, said apparatus comprising a plurality of conveyor channels having a conveyor extending to the respective upper ends of a corresponding plurality of drop chutes, a delivery conveyor disposed below and in vertical alignment with said plurality of drop chutes, and selective arresting means at the lower ends of said drop chutes for contacting each hollow body moving towards said delivery conveyor, said selective arresting means being of the yoke type and being engageable with the leading end of a correctly oriented hollow body to move out of the path of travel of the hollow body in the respective drop chute to said delivery conveyor and engageable with the leading end of an incorrectly oriented hollow body and to snare the same and indefinitely hold back the snared incorrectly oriented hollow body whereby all hollow bodies within the drop chute upstream of the snared hollow body will be held back.

2. An apparatus for automatic handling and orientation of hollow bodies, said apparatus comprising a hopper for storing hollow bodies in random orientation, a plurality of conveyor channels having conveyors extending into said hopper, selective reversing means adapted to turn around incorrectly oriented hollow bodies in said conveyor channels, a plurality of drop chutes disposed in vertical alignment at the ends of said conveyor channel remote from said hopper, a delivery conveyor disposed in vertical alignment with and below said plurality of drop chutes, each of said drop chutes having sensing means for detecting the prolonged presence of a hollow body in its drop chute and in response thereto providing a control signal for stopping the conveyor of the associated conveyor channel, the improvement comprising arresting means of the yoke type in each of said drop chutes disposed below the associated sensing means for snaring and indefinitely holding back an incorrectly oriented hollow body, whereby the holding back of the snared incorrectly oriented hollow body by one of said arresting means eventually causes the prolonged presence of a hollow body in the associated drop chute to be detected by the associated sensing means and thereby stopping the conveyor of its associated conveyor channel.

3. The apparatus of claim 1, wherein said hollow bodies being bottles with necks and normally proceeding bottom first in said drop chutes, wherein said yoke of each of said arresting means comprises a yoke member configured to receive the neck of a bottle proceeding neck first in its drop chute, said yoke members being freely pivotally mounted between a standby position in which said yoke members are disposed substantially transversely of their drop chutes and interposed in the pathways of bottles therein, and an operative position to which said yoke members are pushed by the bottoms of bottom first bottles to clear the same and to which said yoke members are driven by the necks of neck first bottles received in said yoke members holding back the neck first bottles, and biasing means for urging said yoke members constantly to their standby position.

4. The apparatus of claim 3, wherein said yoke members bear against damper means in their standby position.

5. The apparatus of claim 1, wherein a second sensing means is disposed in the upper part of each of said drop chutes, connected in parallel with the associated firstmentioned sensing means, for stopping said conveyor of its associated conveyor channel, wherein each of said second sensing means is actuable by a flap, said flap being longer than the height of said hollow bodies and extending longitudinally to both sides of said second sensing means and overlying and spaced from one of the wall of the associated drop chute.

6. The apparatus of claim 5, wherein said flap comprises a deformable foil.

7. The apparatus of claim 5, wherein said second sensing means comprises a controlled bleed fluidic detector.

8. The apparatus of claim 6, wherein said second sensing means comprises a controlled bleed fluidic detector.

9. The apparatus of claim 1, wherein each of said drop chutes has an associated signaling means disposed at a remote location and responsive to the stopping of said conveyor in its associated conveyor channel.

10. The apparatus of claim 1, wherein each of said drop chutes comprises a pair of lateral partitions and a front plate extending therebetween, at least a portion of each of said front plates being movably mounted to provide access to the corresponding part of said drop chute, and the top portion of each of said drop chute front plates is pivotally mounted and adjustable in position.

11. The apparatus of claim 10, wherein said portion of said front plate is the lower portion thereof and is pivotally mounted, and said top portion of each of said drop chute front plates is pivotally mounted and adjustable in position.

12. The apparatus of claim 3, a hollow body having a spur or flash on its bottom, said arresting means being configured to hold back the last mentioned hollow body.

13. The apparatus of claim 1, the hollow bodies being bottles with necks and bottoms and each normally proceeding bottom first in said drop chutes, said selective arresting means being adapted to enable bottom first bottles to clear the same without interference and being adapted to hold back neck first bottles.

14. The apparatus of claim 2, wherein said hollow bodies being bottles with necks and normally proceeding bottom first in said drop chutes, wherein said yoke of each of said arresting means comprises a yoke member configured to receive the neck of a bottle proceeding neck first in its drop chute, said yoke members being freely pivotally mounted between a standby position in which said yoke members are disposed substantially transversely of their drop chutes and interposed in the pathways of bottles therein, and an operative position to which said yoke members are pushed by the bottoms of bottom first bottles to clear the same and to which said yoke members are driven by the necks of neck first bottles received in said yoke members holding back the neck first bottles, and biasing means for urging said yoke members constantly to their standby position.

15. The apparatus of claim 2, wherein a second sensing means is disposed in the upper part of each of said drop chutes, connected in parallel with the associated firstmentioned sensing means, for stopping said conveyor of its associated conveyor channel, wherein each of said second sensing means is actuable by a flap, said flap being longer than the height of said hollow bodies and extending longitudinally to both sides of said second sensing means and overlying and spaced from one of the walls of the associated drop chute.

16. The apparatus of claim 2, wherein each of said drop chutes has an associated signaling means disposed at a remote location and responsive to the stopping of said conveyor in its associated conveyor channel.

* * * * *